(12) United States Patent
Holoubek

(10) Patent No.: US 7,333,936 B2
(45) Date of Patent: Feb. 19, 2008

(54) BAR CODE SYNCHRONIZATION PROCESS FOR SCANNING MAIL ENVELOPES AND THEIR CONTENTS

(75) Inventor: Michael Jon Holoubek, Annapolis, MD (US)

(73) Assignee: Annapolis Technologies, LLC, Baltimore, MD (US)

( * ) Notice: Subject to any disclaimer, the term of this patent is extended or adjusted under 35 U.S.C. 154(b) by 821 days.

(21) Appl. No.: 10/601,983

(22) Filed: Jun. 20, 2003

(65) Prior Publication Data

US 2003/0236680 A1 Dec. 25, 2003

Related U.S. Application Data

(60) Provisional application No. 60/390,861, filed on Jun. 20, 2002.

(51) Int. Cl.
*G06Q 99/00* (2006.01)
(52) U.S. Cl. .................................. 705/1; 705/401
(58) Field of Classification Search ............... 705/400, 705/1
See application file for complete search history.

(56) References Cited

U.S. PATENT DOCUMENTS

| | | | |
|---|---|---|---|
| 4,201,617 A | 5/1980 | Orsinger et al. ............ 156/351 |
| 5,033,725 A * | 7/1991 | van Duursen ............ 270/52.02 |
| 5,054,620 A | 10/1991 | DeWitt et al. ............... 209/3.1 |
| 5,104,681 A | 4/1992 | Sansone ....................... 427/8 |
| 5,188,464 A | 2/1993 | Aaron .......................... 400/103 |
| 5,310,062 A | 5/1994 | Stevens et al. ............. 209/584 |
| 5,468,945 A | 11/1995 | Huggett et al. ............. 235/462 |
| 5,493,106 A | 2/1996 | Hunter ....................... 235/375 |
| 5,602,382 A | 2/1997 | Ulvr et al. .................. 235/494 |
| 5,737,438 A | 4/1998 | Zlotnick et al. ............ 382/101 |
| 5,810,173 A | 9/1998 | Stevens et al. ............. 209/539 |
| 5,842,577 A | 12/1998 | Stevens et al. ............. 209/3.3 |
| 5,842,693 A | 12/1998 | Stevens et al. ............ 271/4.01 |
| 6,112,902 A * | 9/2000 | Hayduchok et al. ......... 209/3.3 |
| 6,196,393 B1 * | 3/2001 | Kruk et al. ................. 209/630 |
| 6,303,889 B1 | 10/2001 | Hayduchok et al. ......... 209/584 |
| 6,311,846 B1 * | 11/2001 | Hayduchok et al. ......... 209/3.3 |
| 6,897,394 B1 * | 5/2005 | Dibiaso et al. ............. 209/584 |
| 2003/0101148 A1 * | 5/2003 | Montgomery et al. ...... 705/404 |

FOREIGN PATENT DOCUMENTS

DE 3124778 A1 * 1/1983

OTHER PUBLICATIONS

Business Editors & High Tech Writers, NewSoft Announces Presto! PageManager 98; Gold Edition Powerful Scanning OS Tames the Paper Tiger with Fast Scanning and Accurate OCR, Business Wire, May 11, 1998, p. 1.*

* cited by examiner

*Primary Examiner*—John W. Hayes
*Assistant Examiner*—Eric Liou
(74) *Attorney, Agent, or Firm*—Whiteford, Taylor & Preston LLP; Gregory M. Stone; Joseph L. Morales

(57) ABSTRACT

Disclosed is a method and system for enabling the high speed processing of physical mail articles to convert the same into electronic documents that may be electronically distributed to the original intended recipient without requiring the recipient to come into contact with the original, physical mail article.

16 Claims, 3 Drawing Sheets

BAR CODE SYNCHRONIZATION PROCESS FOR SCANNING MAIL ENVELOPES AND THEIR CONTENTS

CROSS-REFERENCE TO RELATED APPLICATIONS

This application is based upon and gains priority from U.S. Provisional Patent Application Ser. No. 60/390,861, entitled "Bar Code Synchronization Process For Scanning Mail Envelopes and Their Contents", filed with the U.S. Patent and Trademark Office on Jun. 20, 2002 by the inventors herein, the specification of which is incorporated herein by reference.

BACKGROUND OF THE INVENTION

1. Field of the Invention

The invention disclosed herein relates generally to methods and systems for digital mail management, and more particularly to a method and system for enabling the high speed processing of physical mail articles to convert the same into electronic documents that may be electronically distributed to the original intended recipient without requiring the intended recipient to come into contact with the original, physical mail article.

2. Description of the Background

Individuals, corporations, government entities, and every other party that receives mail has become increasingly concerned over the threat of contaminated mail. Terrorist events in the United States in 2001 relating to anthrax-laced mail have caused great concern, and at times near panic, over the health threat a person may realize simply by opening a new piece of mail. Since the realization that such a terrorist threat does truly exist, a need has been realized to implement a safeguard that could neutralize the threat of contaminated mail without degrading the general conveniences and limited costs associated with traditional mail delivery.

One avenue to reduce the risk posed by terrorist attempts to contaminate the mail is to prevent distribution of the physical, potentially contaminated mail article to the intended recipient. However, if such recipient is still to receive the information contained in the original mail document(s), a substitute for such physical article must be provided. Such a substitute may take the form of an electronic message including scanned images of the contents of the original, potentially contaminated mail article. In this case, the physical mail article may be delivered to a remote facility employing appropriate safety measures to neutralize the threat of possible contaminants, opened and scanned at such facility, and thereafter delivered digitally to the intended recipient. However, providing a viable digital delivery system, or a method or system for converting a large number of physical mail articles into a form which may be easily and accurately distributed electronically has heretofore not been accomplished.

More particularly, while high speed processing would require high speed scanning equipment that could process mail articles in batches, prior known methods and systems for digitizing mail articles have required the processing of each mail article through smaller, slower scanners because envelopes and their contents cannot be confidently scanned in batch mode. Batch scanning generally requires some consistency with thickness and size of the documents within the batch. Ordinarily, envelopes are thicker but smaller in size than their contents. Likewise, envelopes are generally open at the top end and must be scanned bottom first to prevent misfeeds. Thus, in order to prevent misfeeds, all documents in a batch must have their leading edges on the same line (with the closed envelope edge in the proper orientation) for feeding into a scanner. Unfortunately, it is extremely difficult and time consuming to get the leading edges of a mixed batch of envelopes and contents (i.e., a batch comprised of envelopes and their contents interspersed with one another) to properly align. Therefore, it is more likely to get a scanner jam or double feed or scan out of order in a mixed batch. In a production scanning environment, it would thus be much more efficient to scan envelopes in batches and contents in other batches.

However, scanning envelopes and contents in their own separate batches provides its own difficulties. While address information is at times available on both the contents and the outside of the envelope in which they are shipped, there are often times when address information of the sender is only available on the envelope. Thus, if batches of envelopes and batches of contents are scanned separately, it is necessary that a process for synchronizing the data and images of the separate batches be provided.

It would therefore be advantageous to provide a method and system for scanning mail documents separated into envelope and contents batches, while enabling synchronization of such scanning process to ensure association of all relevant data for each mail article.

SUMMARY OF THE INVENTION

A method and system for enabling the transfer of information within physical mail articles without risking exposure of the intended recipient to hazardous contaminants in the physical mail article are disclosed herein. In a preferred embodiment of such method and system, the physical mail items are preferably scanned in separate batches of envelopes and contents, and the production of electronic documents from the physical originals is preferably managed through the use of multiple bar code sets having the same identifiers for different sets.

In a preferred embodiment of the method and system for scanning mail documents set forth herein, envelopes and their contents are separated into envelope batches and contents batches, and bar code labels are attached to items in each batch. The bar code labels preferably have at least a numerical portion, and the numerical portions of the bar code labels are identical between the two sets, thus enabling correlation between a particular envelope and its contents even after they have been separated from one another. Once the bar code labels are applied, the batches are scanned independently of one another, and the listing of bar codes in each batch are written to a file. Thereafter, the bar code listings for related envelope and contents batches are compared to one another to locate missed bar codes in either batch, in turn prompting further inspection of a precise document in a batch to diagnose the cause of the error. Such batch processing thus enables high speed processing of the physical documents for conversion into electronic form, and automated analyses to quickly and accurately diagnose misread or unscanned pages.

DETAILED DESCRIPTION OF THE PREFERRED EMBODIMENTS

Figure 1:
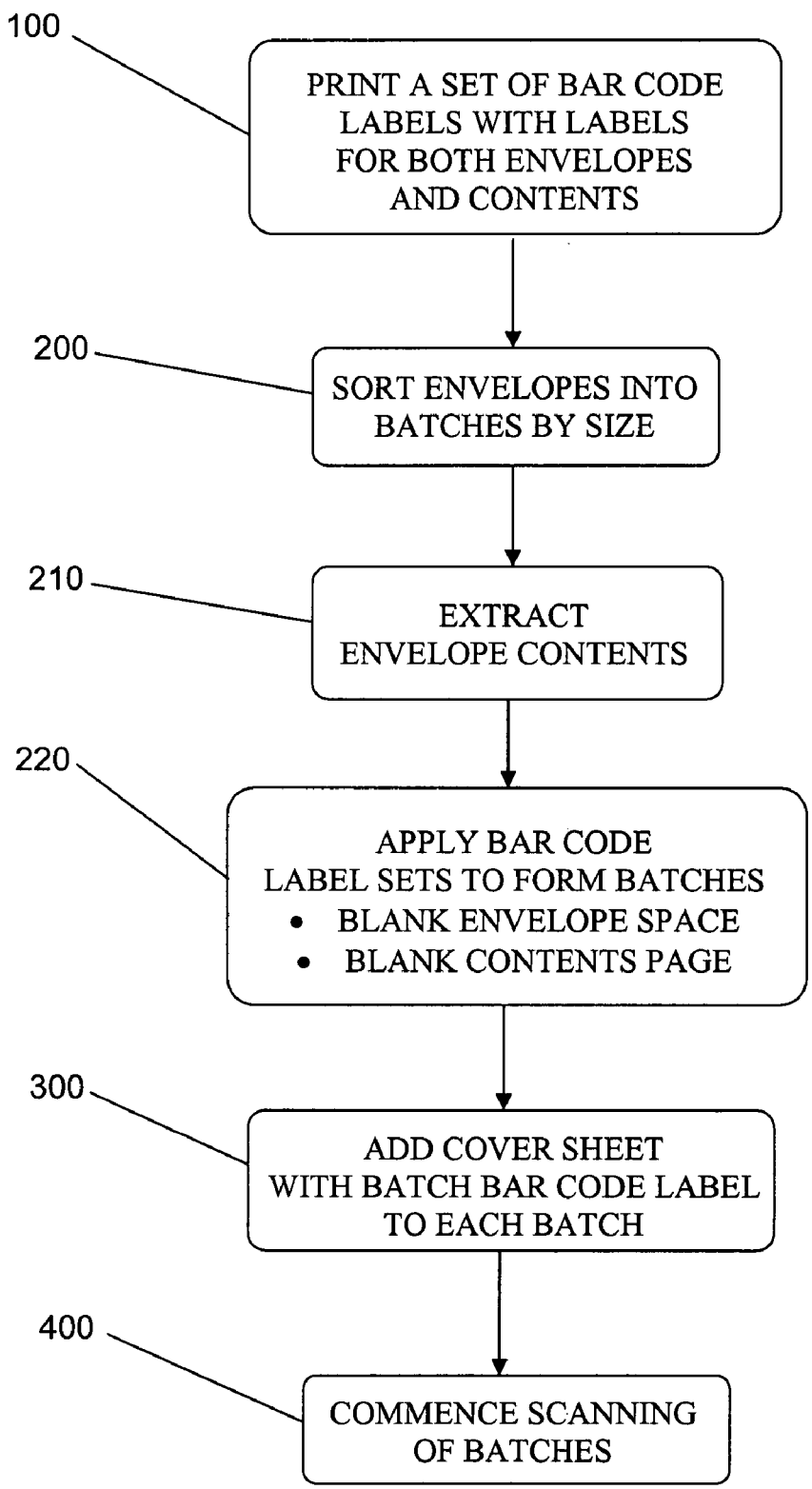
FIG. 1 is a schematic representation of an exemplary method for preparing documents for scanning according to a first aspect of a preferred embodiment of the invention.

The invention comprises a method and system for enabling the transfer of information within physical mail articles without risking exposure of the intended recipient to hazardous contaminants in the physical mail article.

While traditional bar code labeling methods and systems have provided for the printing and/or production of bar codes having unique numbers such that each bar code may be uniquely distinguished, a preferred embodiment of the method and system of the invention generates two sets of sequentially numbered lists of bar code labels, such that one set may be associated with the envelopes of a batch of mail articles, while the other set may be associated with the contents of the same batch of mail articles. Each of the two sets is preferably provided one or more alpha-numeric characters that associate each label with one of the two sets, and a unique number identifying a particular mail article in each set. For example, one of the two sets may be prefaced with a character string such as E or ENV, signifying a label set to be associated with the envelopes in a single batch, and the other set may be prefaced with a character string such as C or CON, signifying a label set to be associated with the contents of that batch. Of course, any other combination of alpha-numeric characters may also be used in such embodiment of the invention, so long as the character strings distinguish the envelope set from the contents set. Preferably, in an embodiment of the invention in which the bar code labels are applied to the batches by hand, the bar code labels are printed in such fashion that envelope labels and content labels are interspersed on a single sheet. Thus, for example, in a sheet of labels having multiple rows and columns of bar code labels, proceeding down a single column, the bar code labels would be produced such that a first label may, for example, have the prefix ENV followed by a numeral, the second label would have the prefix CON followed by the same numeral, the third label would have the prefix ENV followed by a second numeral (preferably a single numerical iteration away from the first numeral), the fourth label would have the prefix CON followed by the second numeral, and so on throughout the entirety of the labels on the sheet. In this way, a human label applicator may easily follow an organized sequence for labeling batches without having to switch between label sheets, in turn reducing the risk of human error resulting in mislabeled items.

As mentioned above, the other portion of each bar code label includes a number identifying a particular mail article in each of the envelope and content sets. The number portion of the bar code is identical for each set. Thus, for example, in a batch initially comprised of 30 envelopes and their contents (which becomes separated into a stack of 30 envelopes and a separate stack of their associated contents), the two sets of labels may comprise a first set having labels formatted as ENV0011, ENV0002, ... ENV0030, with the second set having labels formatted as CON0001, CON0002, ... CON 0030.

As shown in the schematic view of FIG. 1, in addition to preparation of the coordinated sets of bar code labels, at step 100, a preferred embodiment of the invention also requires that the envelopes and contents be physically prepared. At step 200, an initial sort may be provided in which envelopes of like size are collected into groups, and batches (e.g., batches of 30 envelopes with their contents) are pulled from each such group of like-sized envelopes. In this way, each envelope batch will be of uniform size so as to minimize the risk of document feed errors in the scanning equipment. After such sorting of like-sized envelopes and selection of a batch therefrom, the envelopes of the batch are opened and their contents extracted at step 210, thus forming a batch of envelopes and a batch of contents. Bar code labels conforming to the numbering scheme outlined above may then be applied at step 220 as follows.

With both the envelope and contents batches arranged in corresponding order, a label from the label set corresponding to the envelopes is applied preferably to any open space on either the front or back of each consecutive envelope, until the envelope bar code labels for that batch are fully expended. A label from the label set corresponding to the contents is likewise applied to each set of contents. If the first page of the contents is one-sided, and thus has an available blank back side, the label is preferably applied to the blank, back side of the first page. If the first page is two-sided, a blank page is preferably inserted at the front of the contents, and the label is applied to such newly inserted blank page. Thus, each item of contents will preferably have at least one page that is blank bearing a bar code label. As will be explained in greater detail below, the application of the label to a blank page allows for a highly efficient automated sort of scanned content pages to identify only those scanned images that contain bar codes, based simply on the known image file size of a blank page of paper having only a bar code placed thereon. Such a sorting of only those pages bearing bar codes enables a system operator to quickly view a series of bar code labels scanned in a single batch, and likewise promptly identify any bar codes (and associated contents) that are missing or not in appropriate consecutive order in a batch. It should be noted that while for simplicity, the labels can be applied by a human clerical employee, the application of the bar code labels may likewise be achieved through the use of automated labeling equipment which physically applies the labels to the free space of an envelope or a blank page in the contents documents, or may even be printed thereon, without departing from the spirit and scope of the invention. Thus, as used herein, the term "label" is intended not to be limited to an adhesively applied label bearing a barcode, but any alpha-numeric character string or machine-readable data printed or otherwise placed on the envelope or contents page so as to mark that document with an associative identifier linking it to its envelope/contents counterpart.

So as to reduce the risk that corresponding envelope and content bar code labels are misapplied to individual envelopes or content collections that do not in fact correspond with one another, it is advisable that the application of labels be performed pursuant to a continuous process of applying an envelope label first to the open space of the envelope, opening the envelope and extracting the contents, applying the associated contents label to the back side of the first page of the contents (or inserting a blank page having such bar code label), and adding the newly labeled envelope and contents set to their respective batches.

Once a batch of envelopes and corresponding contents has been so labeled, a blank sheet bearing a batch bar code label is preferably placed with each batch at step 300 so as to uniquely identify each batch. The bar code labels applied to associated batches of envelopes and their contents preferably include the same number so as to establish the correlation between the associated envelope and contents batches. Moreover, as with the bar code labels associated with the individual envelopes and their contents, the labels associated with separate batches may include an alpha-numeric character string to identify the batch as either an envelope batch (such as by inclusion of the character string "ENV" or "BENV") or a contents batch (such as by inclusion of the character string "CON" or "BCON"). By associating such a separate batch identifier with each batch, associated batches of envelopes and their contents remain linked by the machine-readable batch identifier, thus enabling the entirely separate processing of envelope and contents batches.

The bar code label applied to such sheet may also be used to provide a signal to the scanning equipment that a new batch is queued for processing. More particularly, the scanning control software may be configured to recognize a particular bar code label as a batch bar code label. Thus, when a new batch bar code label is scanned, the software may automatically create a new database batch file identifiable by the batch bar code, scan the documents (envelopes or contents) that follow, and save the scanned images to the database batch file associated with that batch bar code label, in turn creating an electronic library of scanned images sorted into their respective batches.

Further, it is preferred that the blank sheet to which the batch label is attached be a sheet having a distinct color, such as a pastel color, so as to enable a human operator to readily distinguish separate batches while ensuring that an appropriate resolution is maintained between the graphics on the label and the sheet itself. This ensures that the bar code label remains distinguishable from the paper sheet to which it is applied.

As mentioned above, after the batches have been prepared as above with bar code labels, scanning and automated document processing may proceed at step 400. Each batch, whether envelopes or contents, is scanned using high speed scanning equipment. Separation of the batches into like-sized envelopes and separate contents allows such high speed scanning to proceed with reduced risk of misfeeds.

Figure 2:
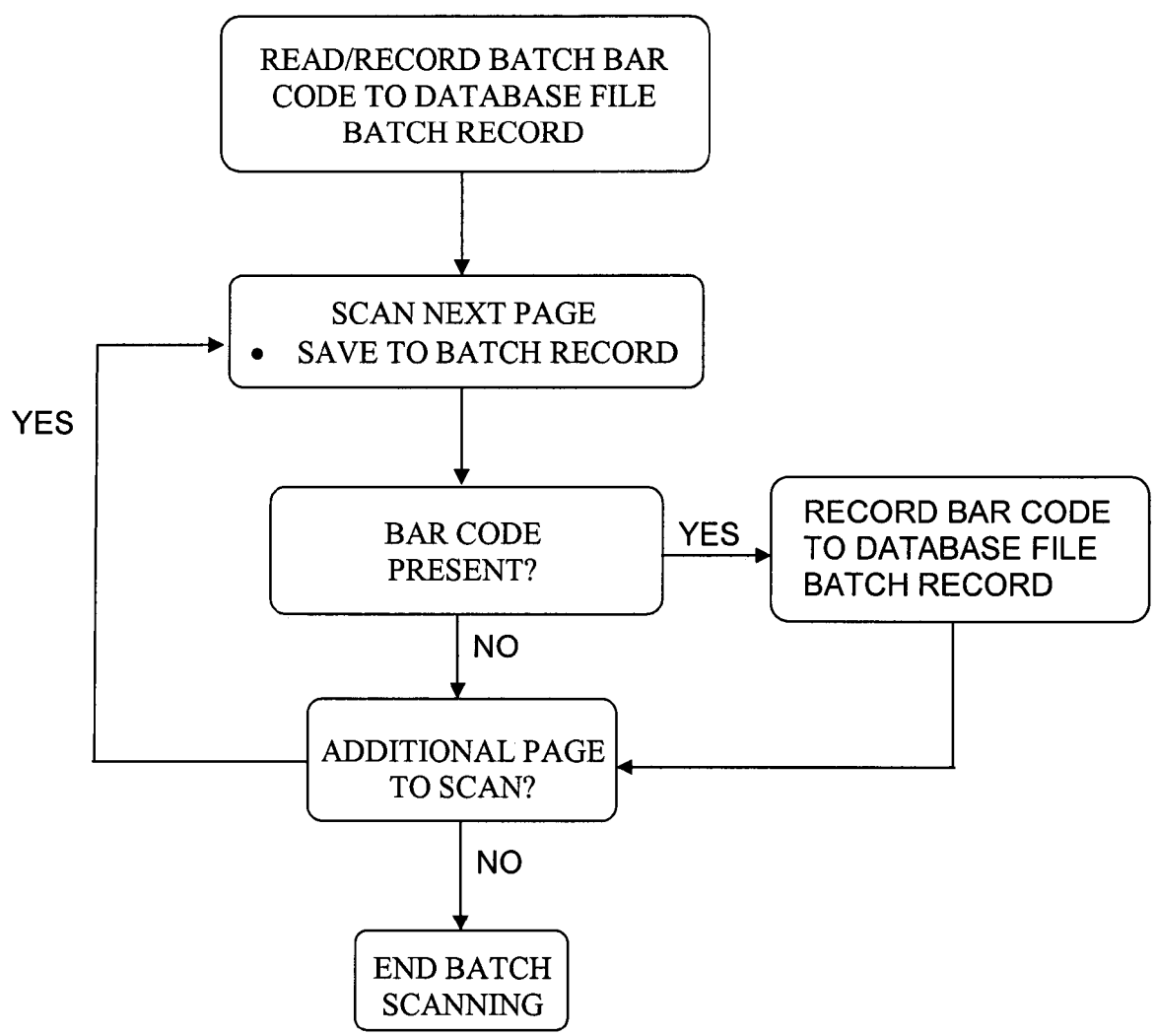
FIG. 2 is a schematic representation of an exemplary method for scanning documents according to another aspect of a preferred embodiment of the invention.

As shown in the schematic view of FIG. 2, each envelope batch is scanned preferably so as to create an electronic image of the front and back of each envelope. The electronic images are preferably stored in memory or on a hard drive that is in communication with, for example, a controlling microprocessor having control logic thereon (preferably in the form of software), which control logic operates and controls the system. Additionally during such scanning process, each envelope bar code label is scanned and a file is written that lists all of the individual envelope bar codes scanned in the batch, as well as the general envelope batch bar code applied to the blank sheet at the start of the batch. Such file is also preferably stored in memory or on a hard drive, and is particularly linked to the electronic images corresponding to such batch. For example, the images and bar code data may be managed by a database software program, with the images, individual envelope bar codes, and general batch bar code together comprising a single "batch record" in the database.

Likewise, each contents batch is scanned so as to create an electronic image of the front and back of each contents page. These electronic images are also preferably stored in memory or on a hard drive as set forth above. Further, each contents bar code label is likewise scanned during the scanning process, and a file is written that lists all of the individual contents bar codes scanned in the batch, as well as the general contents batch bar code applied to the blank sheet at the start of the batch. This file is also stored in memory or on a hard drive, and as with the envelope batches, it is particularly linked to the electronic images corresponding to such batch.

It should be noted that because the contents and envelope batches are entirely separate from one another, and once scanned, are indexed via the batch bar code labels so that corresponding electronic envelopes and contents files may be identified, their physical processing and scanning may be carried out independently of one another.

Figure 3:
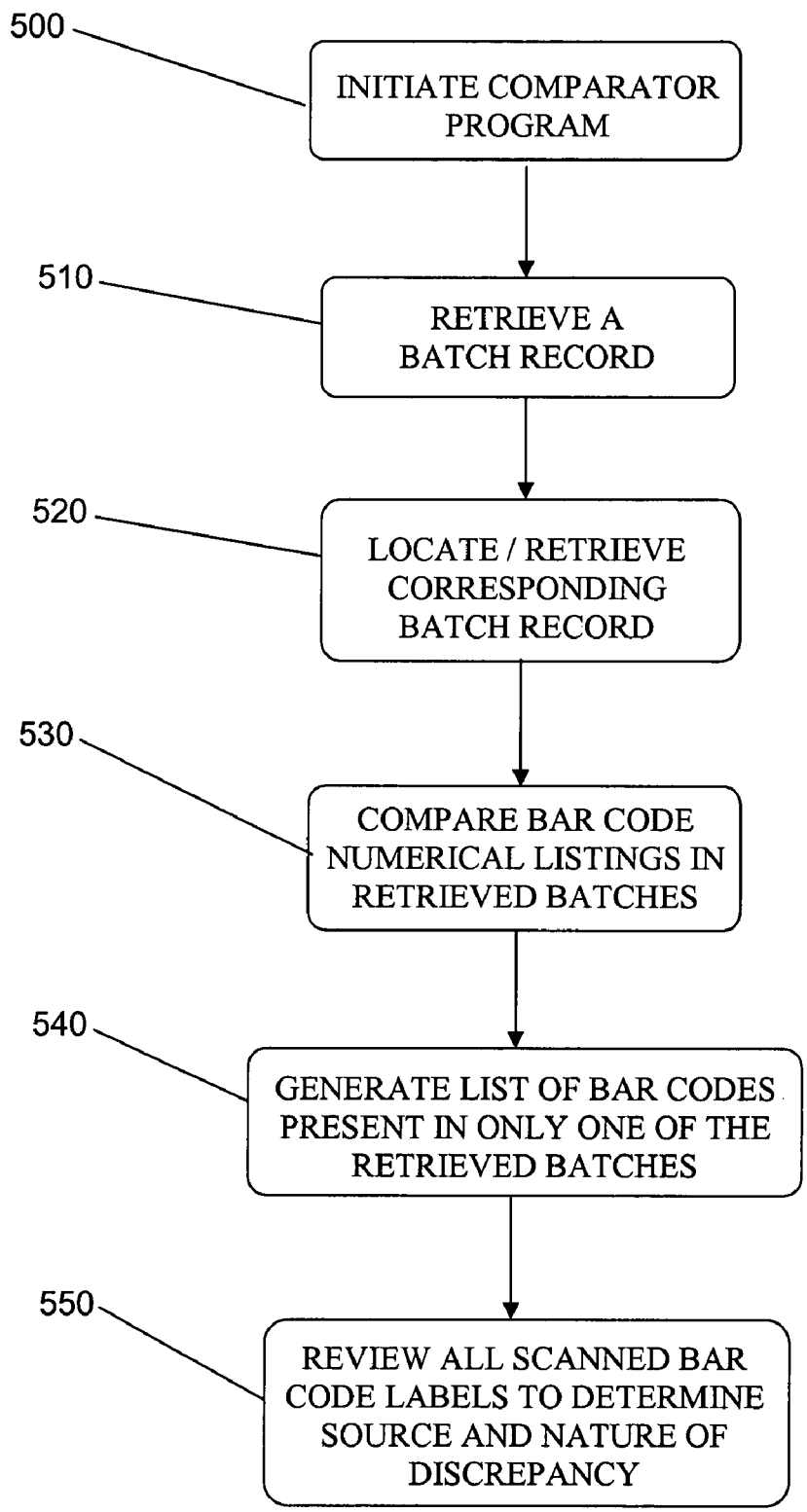
FIG. 3 is a schematic representation of an exemplary method for automatically comparing scanned batches of documents according to yet another aspect of a preferred embodiment of the invention.

Once corresponding batches of envelopes and contents have been scanned and the computer files listing all individual bar codes identified in a scanned batch are generated, an automated bar code comparator software program is initiated to confirm at step 500 (FIG. 3) correlation of the elements in related envelope and contents batches. Preferably, initiation of such comparator software program occurs automatically upon saving a completed new batch file to the database, whether such batch comprises envelopes or contents. Upon the completion of a new batch file, the software program thus automatically checks to see if the correlating envelope or contents batch file has yet been created and, if it has, initiates the following comparator process. First, the comparator at step 510 retrieves from a batch record the bar code input from scanning the bar code label attached to the blank sheet at the start of an envelope or contents batch (i.e., the "batch bar code"), and likewise retrieves the list of individual bar code numbers for the elements in that batch that have been scanned. The comparator then at step 520 locates the corresponding envelope or contents batch record by finding the corresponding batch that shares the same batch bar code numeral, but with a differing prefix identifying the batch as either an envelope or contents batch. Once located, the comparator retrieves from the located batch record the list of individual bar code numbers for the elements in that batch.

Once the individual bar code numbers have been so retrieved, at step 530 the comparator analyzes each list of bar code numbers to determine whether a 1:1 correlation exists between the numerical portions of the bar codes in the two lists. In the event that a 1:1 correlation does exist, further automated processing of the batches in preparation for electronic delivery may proceed, as further set forth below. However, in the event that a 1:1 correlation does not exist, a list is preferably generated at step 540 of any bar code numerals in corresponding envelope and contents batches that are present in only one of those batches. Such presence of a particular bar code numeral in only one of the corresponding batches indicates that the other related batch contains one or more documents which were not properly scanned, and thus requires intervention. When such a "missing" bar code numeral is identified, the system retrieves the images scanned in each of the two related batches, and preferably displays them to a human operator. The human operator may then at step 550 sort the scanned images by file size, and display only those images having a file size corresponding to a blank page having only a bar code placed thereon. By viewing those bar code pages, the user may thus readily visually identify the nature of the problem, such as whether documents were entirely missed during the scanning process, or if a bar code label was simply misapplied such that the system was incapable of properly reading that particular bar code label. After diagnosing the particular problem, the operator may then take whatever corrective action is necessary, such as rescanning pages that were missed in the original scan, or confirming that the error was due to a misapplied or damaged (and thus unread) bar code label, in which case the operator may manually modify the batch record adding the previously unread bar code. Alternately, the operator may simply confirm during their visual review that all documents in each batch were scanned despite an unread bar code, and in turn release both batches for further processing.

Once the batches have either been confirmed to have a 1:1 correspondence in bar code numerals, or have been corrected or manually reviewed, approved, and released for further processing, the system then merges the corresponding batch records into a single batch record comprised of individual envelope and contents records, and then within each batch, further processes each combined envelope and contents record. Each such combined record may be formatted for data entry, e.g., entering an electronic address (such as an email address) for the intended recipient of the combined record. The combined records may also optionally be subjected to an optical character recognition ("OCR") process to convert all or a portion of the envelope and contents data to a format other than an image file. In any event, once the designated recipient for a combined envelope and contents record has been identified, that record may be dispatched electronically to the intended recipient, thus providing them the full informational content they were intended to receive, without incurring risk of potentially contaminated mail articles.

Preferably, for use in a production environment, a high speed scanner is utilized to scan the envelopes and contents. Suitable high speed scanning equipment may include, by way of example, a Kodak Imagelink 9500, which units are readily commercially available. Further, the computer software necessary to implement the method of the instant invention may be configured to run on a Windows platform, a UNIX platform, or any other operating system. Moreover, while the above description of a preferred embodiment of the invention particularly describes manual sorting of documents, label application, etc., it should be noted that automated mail handling apparatus may likewise be used. For example, U.S. Pat. No. 6,196,393 entitled "Extraction and Scanning System" (the specification of which is incorporated herein by reference) discloses an automated system for opening and scanning the contents of envelopes and storing such image in digital form in a file. Such apparatus may be suitable for automating the mail item opening and scanning processes described herein, so long as such apparatus is operated so as to scan both envelopes and their contents in separate batches.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method for processing mail items, comprising the steps of:
    separating said mail items into an envelope batch and a contents batch;
    applying a first set of labels to said envelope batch, said first set of labels further comprising a first sequential series of alpha-numeric characters;
    applying a second set of labels to said contents batch, said second set of labels further comprising said first sequential series of alpha-numeric characters;
    scanning envelopes in said envelope batch and generating a first list of alpha-numeric characters and envelope images from said envelope batch wherein said first list of alpha-numeric characters is read from said first set of labels;
    scanning contents pages in said contents batch and generating a second list of alpha-numeric characters from said contents batch wherein said second list of alpha-numeric characters is read from said second set of labels; and
    merging said envelope images with said contents pages images having common alpha-numeric characters so as to create a combined mail item image for each said mail item.

2. The method of claim 1, further comprising the step of:
    prior to said step of merging said envelope images with said contents pages images, comparing said first and second lists of alpha-numeric characters to identify individual alpha-numeric characters present in only one of said envelope batch and said contents batch.

3. The method of claim 2, further comprising the step of: after said comparing step, generating a database report indicating any occurrences of the said alpha-numeric characters being present in only one of said envelope batch and said contents batch.

4. The method of claim 2, further comprising the step of:
    after said comparing step, displaying only said envelope images and said contents pages images that include an image of said labels.

5. The method of claim 1, further comprising the steps of:
    prior to said step of applying a second set of labels to said contents batch, inserting a blank page in at least one of said contents batches, said step of applying a second set of labels to said contents batch further comprising applying a label from said second set of labels to said blank page.

6. The method of claim 4, further comprising the steps of: prior to said step of displaying said envelope images and said contents pages images, sorting said images based upon image file size and selecting for display those images of a file size about equal to an image of said blank page bearing only a label.

7. The method of claim 1, said first set of labels further comprising at least one alpha-numeric character identifying said first set of labels as envelope batch labels, and said second set of labels further comprising at least one alpha-numeric character identifying said second set of labels as contents batch labels.

8. The method of claim 1, further comprising the steps of:
    prior to said separating step, sorting said mail items into groups having common envelope sizes.

9. The method of claim 1, further comprising the steps of printing said first and second sets of labels interspersed with one another in order of their alpha-numeric characters.

10. The method of claim 1, wherein said steps of applying said first and second sets of labels further comprise sequentially applying one of said labels from said first set of labels having an alpha-numeric designation, followed by applying one of said labels from said second set of labels having the same alpha-numeric designation, and continuing said sequential application of said labels for all envelopes in said envelop batch and all contents pages in said contents batch.

11. The method of claim 1, further comprising the steps of:
    transmitting to an intended recipient of said mail items said combined mail item image.

12. A system for processing mail items, comprising:
a scanner; and
a control program operative on a microprocessor in electrical communication with said scanner, said control program being operative to print a first set of labels comprising a first sequential series of alpha-numeric characters and a second set of labels comprising said first sequential series of alpha-numeric characters, said control program being further operative to:
receive a first list of alpha-numeric characters and envelope images associated with said first sequential series of alpha-numeric characters;
receive a second list of alpha-numeric characters and contents pages images associated with said first sequential series of alpha-numeric characters; and
merge said envelope images with said contents pages images having common alpha-numeric characters so as to create a combined mail item image for each said mail item.

13. The system of claim 12, said control program being further operative to compare said first and second lists of alpha-numeric characters to identify individual alpha-numeric characters present in only one of said first and second lists.

14. The system of claim 13, said control program being further operative to generate a database report indicating any occurrences of alpha-numeric characters being present in only one of said first and second lists.

15. The system of claim 13, said control program being further operative to display only said envelope images and said contents pages images that include an image of one of said alpha-numeric characters.

16. The system of claim 12, said control program being further operative to transmit to an intended recipient of said mail items said combined mail item image.

* * * * *